United States Patent [19]

Goertzen

[11] 4,392,538

[45] Jul. 12, 1983

[54] ADJUSTABLE HANDLE ASSEMBLY FOR WALK-BEHIND GARDEN IMPLEMENT

[75] Inventor: Gerold G. Goertzen, St. Anne, Ill.

[73] Assignee: Roper Corporation, Kankakee, Ill.

[21] Appl. No.: 229,521

[22] Filed: Jan. 29, 1981

[51] Int. Cl.³ .............................................. B62D 51/04
[52] U.S. Cl. ................................. 180/19 R; 16/111 A; 403/97; 403/322
[58] Field of Search ............................ 180/19.1, 19.3; 280/655, 47.37 R, 47.37 L, 47.37 C; 16/111 A, 112, DIG. 38; 403/93, 97, 116, 316, 317, 322

[56] References Cited

U.S. PATENT DOCUMENTS

| 2,827,842 | 3/1958 | Peterson et al. | 180/19.1 |
| 2,893,497 | 7/1959 | Vellenzer | 280/47.37 R |
| 4,244,427 | 1/1981 | Enters et al. | 172/42 |

FOREIGN PATENT DOCUMENTS

| 158367 | 3/1954 | Australia | 180/19.1 |
| 1070931 | 12/1959 | Fed. Rep. of Germany | 180/19.1 |
| 83807 | 6/1920 | Switzerland | 180/19.1 |

Primary Examiner—Joseph F. Peters, Jr.
Assistant Examiner—Ross Weaver
Attorney, Agent, or Firm—C. Frederick Leydig; Dennis R. Schlemmer; David J. Richter

[57] ABSTRACT

A walk-behind garden implement including a wheel-supported frame carrying a horizontal base member. A handle extends upwardly and rearwardly from the base member for manual guidance. A yoke of U-shaped cross section is interposed between the handle and base member. The lower end of the handle is pivoted between the side walls of the yoke for adjustment of angular elevation. The bottom wall of the yoke has a vertically extending pivot connection for side-to-side, or azimuthal, adjustment of the handle. The handle carries an arcuately arranged set of spaced recesses at its lower end and the base member is also formed with a set of recesses. A first latching member pivoted in the yoke has an upwardly projecting tooth for holding the handle rigidly at a selected elevation. A second latching member pivoted in the yoke has a downwardly projecting tooth for engaging one of the recesses in the base member so that the handle is held rigidly at a selected azimuth. The latching members are pivoted for rocking movement about a common horizontally extending axis in scissoring relation so that their adjacent outwardly presented ends move vertically in opposite directions as the latch members are engaged and disengaged. A single manually operated releasing member is coupled to the latching members for temporarily moving the same to their disengaged positions for adjustment purposes. In an alternate embodiment the latching members are embodied in a single centrally pivoted lever.

12 Claims, 10 Drawing Figures fig. 1.

ADJUSTABLE HANDLE ASSEMBLY FOR WALK-BEHIND GARDEN IMPLEMENT

The desirability of making the guidance handle for a walk-behind implement vertically adjustable as well as adjustable in horizontal position has been recognized for a number of years. Thus Howard U.S. Pat. No. 2,479,931, which issued in 1949, shows an adjusting means which is based upon use of sets of arcuate slides extending horizontally and vertically and which may be pinned in selected positions. However, the Howard structure is unsatisfactory since the arcuate slides not only take up too much room but are subject to jamming due to dirt or corrosion.

Petersen et al. U.S. Pat. No. 2,827,842 shows a two-axis adjustment for a handle on a tiller. The multi-part construction requires use of a nonunitary handle, and separate, rather heavy, latch and release mechanisms are required. In general the construction is expensive and not suited for use with a light duty tiller.

Olson U.S. Pat. No. 3,016,957 (see especially FIG. 3) is another example of two-axis handle adjustment which is relatively heavy and ponderous, being suited for use only with parts of cast construction. The release mechanisms, similarly to U.S. Pat. No. 2,827,842, are inherently heavy and require separate actuation.

Oertle, Jr. U.S. Pat. No. 2,989,127 is a further example of a rather elaborate two-axis adjustment for a handle (see especially FIGS. 1, 2 and 4) and the same comments apply.

It is, accordingly, an object of the present invention to provide a two-axis adjustment for the handle of a walk-behind garden implement which is sturdy, positive and safe in its positioning action but which is nonetheless of simple and light construction easily and economically fabricated using a minimum number of parts.

It is another object to provide a two-axis adjustment for a garden implement handle in which the adjustment may be quickly and easily changed by convenient manipulation with the implement either stationary or in motion. It is a related object to provide a two-axis adjustment for a walk-behind implement in which disengagement and re-engagement may be accomplished with a minimum amount of "throw" and a minimum amount of friction, substantially unaffected by the presence of dirt or other debris or by rusting or corrosion which may occur upon passage of time. Thus the construction is to be distinguished from prior constructions which rely upon reciprocating slides or keys in which dirt, corrosion or the like is capable of causing friction and binding and which must resort to massive release linkages.

It is another object, related to the above, to provide a two-axis handle adjustment for a garden implement in which latching members are provided for the vertical and horizontal adjustment of the handle, the latching members being arranged side by side in a protected position and under the control of a single manually operated releasing member for concurrent release and re-engagement. It is a more specific object to provide a two-axis handle adjustment in which the single releasing member acts simultaneously in opposite directions upon a pair of adjacently pivoted latch members. In one of the aspects of the invention it is an object to provide a handle adjusting mechanism having provision for automatic sequential release and engagement.

It is a general object to provide a two-axis adjustment for a handle which is of compact construction, self-contained at the lower end of the handle, which does not encroach upon, nor take up any space required by, the implement itself and which may be used in a wide variety of walk-behind implements of both existing and new designs.

Finally it is an object to provide a handle adjusting assembly for a walk-behind garden implement which is inherently long-lived, and which is capable of operating without periodic maintenance or other attention reliably and safely over long periods of time.

Other objects and advantages of the invention will become apparent upon reading the attached detailed description and upon reference to the drawings in which.

While the invention has been described in connection with certain preferred embodiments, it will be understood that the invention is not limited thereto and I accordingly intend to cover the various alternative and equivalent arrangements included within the spirit and scope of the appended claims.

Figure 1:
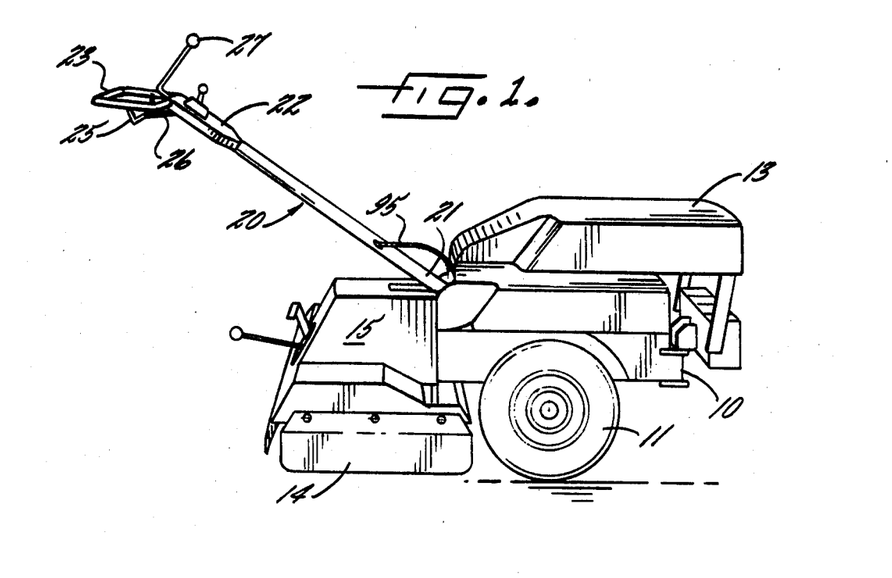
FIG. 1 is a side elevation, in perspective, of a walk-behind garden tiller employing the features of the present invention.
Figure 2:
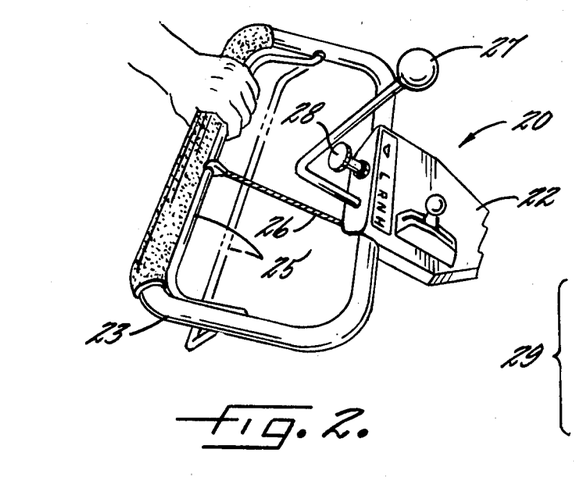
FIG. 2 is a perspective view showing the controls at the upper end of the handle.
Figure 3:
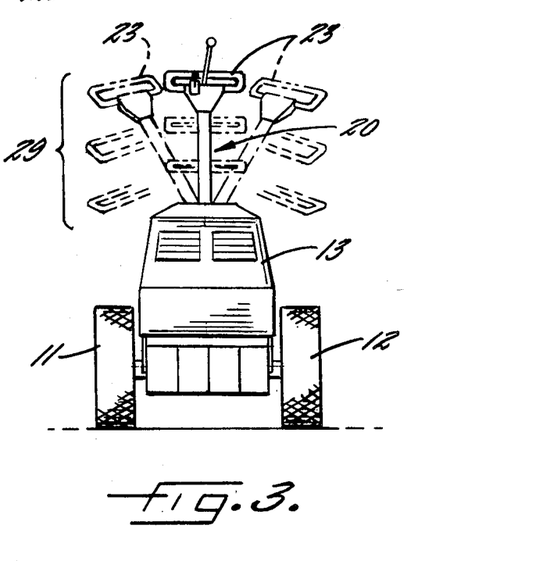
FIG. 3 is a front elevation of the implement showing the handle in a portion of the available positions of vertical and lateral adjustment.

A walk-behind garden tiller of modern design, illustrated in FIGS. 1–3, includes a horizontal frame 10 supported upon a pair of ground-engaging drive wheels 11, 12. The frame supports an engine (not shown) enclosed within an engine housing 13. At the rear of the frame is a tine enclosure 14 containing a set of rotary tines (not shown) which are power driven through a transmission (not shown) enclosed within a transmission housing 15. Extending upwardly and rearwardly from the frame is a unitary handle 20 having a lower end 21 and an upper, or guiding, end 22. Rigidly secured to the upper end of the handle is a hand grip 23 formed of a tube bent into picture frame shape. Bridging the hand grip and pivoted to the sides thereof is a bail 25 which is connected by a cable 26 to a power control member, typically a clutch at the engine output so arranged that the clutch is engaged only during the time that the bail is actively gripped thereby providing what is generally referred to as "dead man" control. A shift lever 27 enables shifting of gears in the transmission.

Adjacent the shift lever is a knob 28 which, as will be described, is connected to a "Bowden" type flexible control cable which releases the handle for manual adjustment, with respect to the frame, to a more convenient elevation and lateral position, or azimuth. A total of nine possible positions have been illustrated at 29 in FIG. 3 and, depending upon the specific design, an even greater selection of positions is possible.

In accordance with the present invention a horizontal base member is mounted on the frame having, superimposed thereon, a yoke of U-shaped cross section. The lower end of the handle is received between the side walls of the yoke on a horizontally extending pivot connection for angular elevation of the handle with respect to the frame. The bottom wall of the yoke is secured to the base member by a vertically extending pivot connection for azimuthal adjustment of the handle with respect to the frame. A first latching member is interposed between the handle and the yoke and a second latching member is interposed between the yoke and the base member, the latching members having engageable teeth so that the handle is held rigidly at a selected elevation and azimuth. A manually operated releasing member is provided for temporarily disengaging the latching member thereby permitting the handle to be manually adjusted with respect to the frame to a more convenient elevation and azimuth.

Turning now to FIGS. 4–8 there is shown a base member 30 having a horizontal surface 31 and supported upon a bracket 32 bolted to the frame 10 of the implement.

Figures 6, 7:
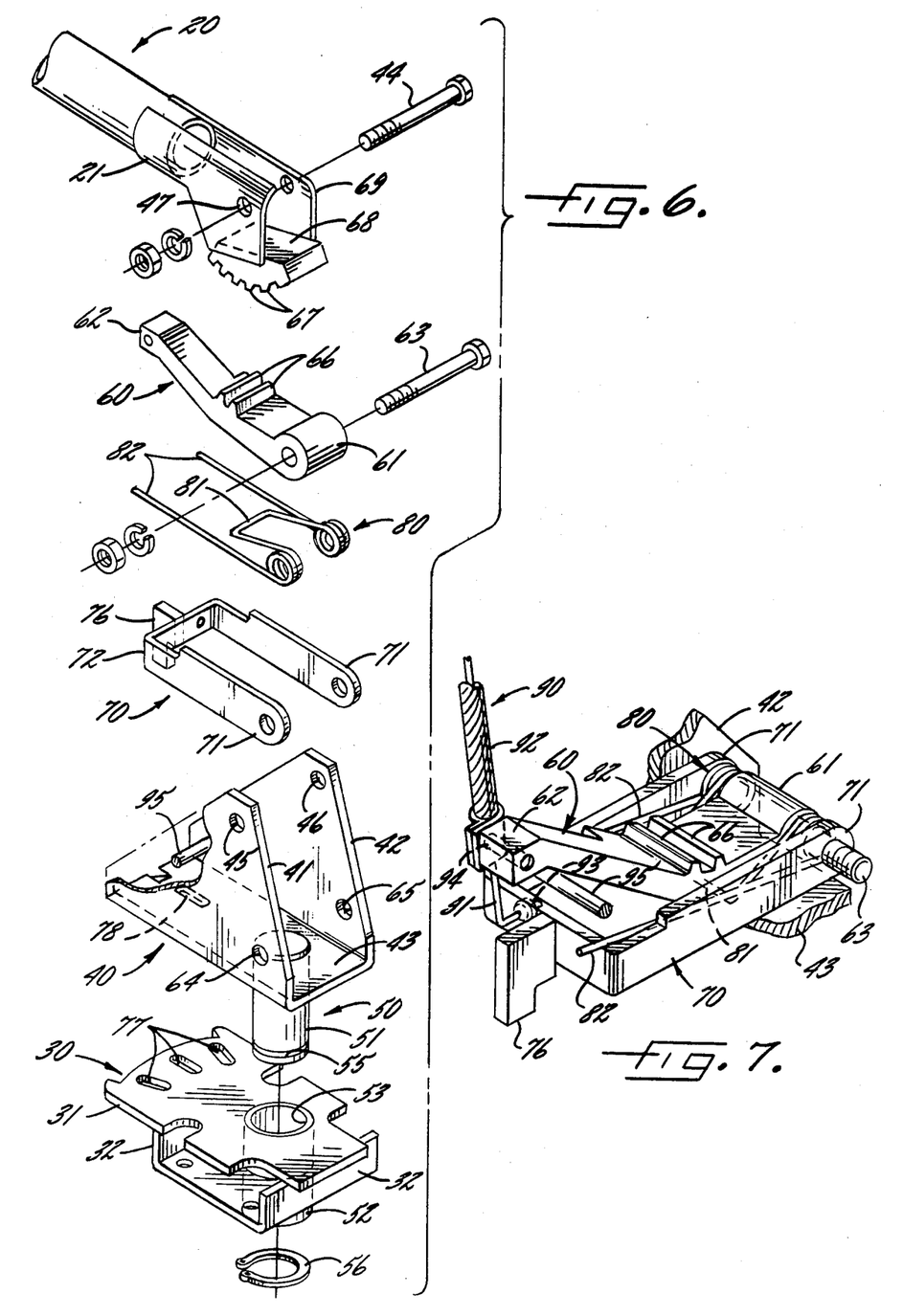
FIG. 6 is an exploded view showing the lower end of the handle, the latching members, the yoke which contains them, and the base member upon which the yoke is seated.
FIG. 7 is a fragmentary perspective based upon FIG. 6 showing the latching members in operating relation and with an interposed spring urging them in opposite directions.

Superimposed upon the base surface 31 is a yoke 40 having a pair of spaced side walls 41, 42 and a bottom wall 43. The lower end 21 of the handle is received between the side walls, and pivoted to them by a hinge connection formed of a horizontally, that is, transversely, extending bolt 44 for angular elevation of the handle, the bolt penetrating aligned openings 45, 46 in the side walls and 47 in the lower handle (FIG. 6).

For the purpose of enabling lateral, or azimuthal, swing of the handle a vertical pivot connection 50 is provided between the yoke 40 and the base 30. Such connection is formed by a hollow downwardly projecting post 51 which is welded to the underside of the yoke and which is fitted to enter a cylindrical bearing 52 in the form of a sleeve which is welded to the base member 30 to define a receiving opening 53 therein. The post is provided with an annular groove 55 at its outer end, the post being dimensioned to extend slightly below the bearing so that a snap ring 56 may be fitted in the groove to serve as retainer (FIG. 4).

In carrying out the invention a first toothed latching means is provided at the lower end of the handle including a latching member which is pivoted in the yoke for movement between engaged and released positions. Such latching member indicated at 60 (FIGS. 4, 5 and 7) has an inner end 61 and an outer end 62. The inner end is pivoted to a transversely extending bolt 63 received in a pair of aligned openings 64, 65 in the walls of the yoke (FIG. 6). Projecting upwardly from the central portion of the latching member 60 are one or more teeth 66. The teeth are arranged to register with an arcuately arranged set of spaced recesses 67 formed in an arcuate rack member 68 which is secured to the lower end of the handle by means of a shell extension 69 of inverted "U" cross section. The rack member is thus rigid with the handle, lying below, and concentric with, the handle pivot bolt 44.

Figure 4:
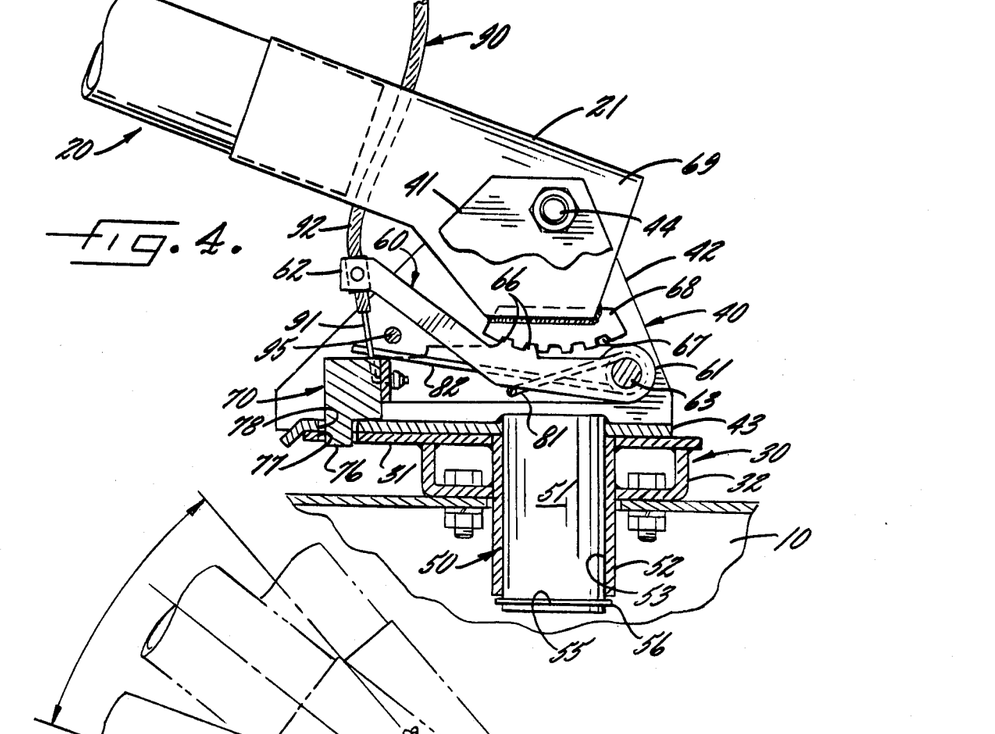
FIG. 4 is a fragmentary elevational view showing the yoke and its contained latching members at the lower end of the handle, the near side wall of the yoke removed for visibility.
Figure 5:
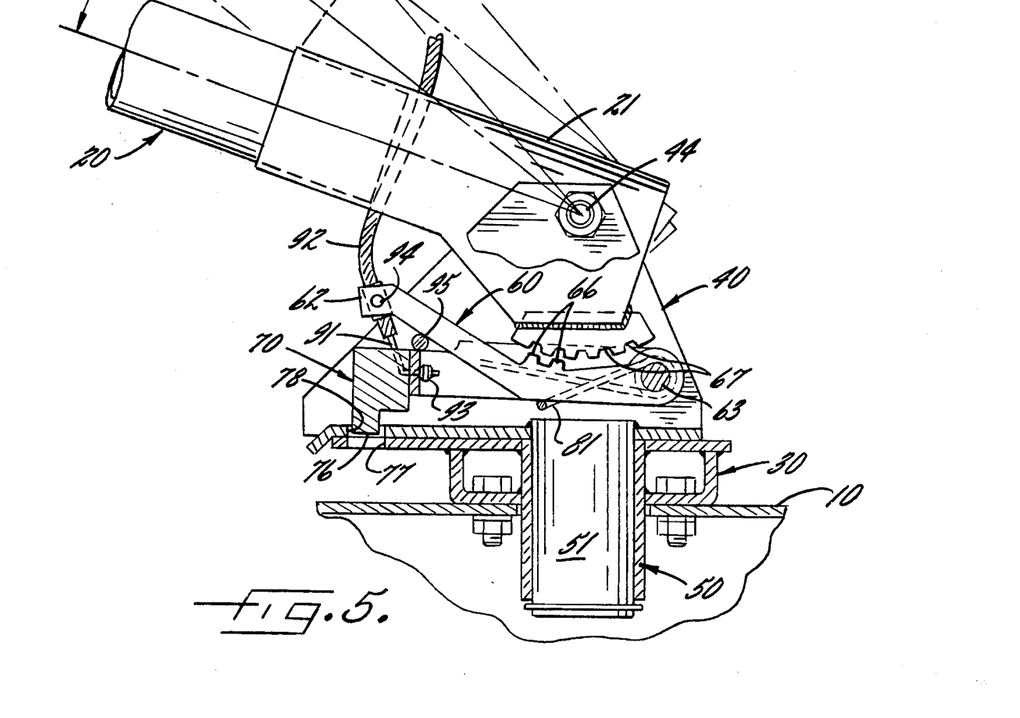
FIG. 5 is a view similar to FIG. 4 but showing the latching members in the released state.

It will be apparent, then, that when the latching member 60 is in the position illustrated in FIG. 4 the tooth 66 thereon is engaged with a selected one of the recesses 67 to hold the handle rigidly at a given angular elevation. When the latching member 60 is disengaged by rocking it downwardly about pivot bolt 63 for temporary disengagement of the teeth, the handle may be manually adjusted to a more convenient elevation.

For the purpose of determining the azimuthal position of the handle, a second latching means is provided including a second latching member in the yoke interposed between the yoke and the base member. This second latching member, indicated at 70 is of spur-shaped construction having a pair of laterally spaced inner ends 71 and an outer end 72, with the inner ends being pivoted to receive the same pivot bolt 63 which mounts the latching member 60 previously referred to. Formed on the outer end 72 of the latching member 70 is a downwardly extending central tooth, or tang, 76 which cooperates with an arcuately arranged set of spaced recesses 77 in the base member 30 (FIG. 6). The bottom wall 43 of the yoke 40 includes an aperture 78 to provide clearance, as well as lateral support, for the tooth 76 as it engages the selected recess.

With the second latch member 70 in its lower position illustrated in FIG. 4, the yoke 40, and therefore the handle 20 which is secured to it, will be rigidly positioned in azimuth, with respect to the base member and implement frame, but when the latching member 70 is temporarily raised the tooth 76 is withdrawn, permitting the handle to be swung laterally to a more convenient angular position.

In carrying out the invention a biasing spring is provided in the yoke for simultaneously biasing both of the latching members 60, 70 into their recess-engaging positions, the first latching member 60 being urged upwardly while the second latching member 70 is urged downwardly. This is accomplished by a specially shaped torsion spring 80 which encircles the bolt 63 and which has a cross member 81 which bears upwardly against the first latching member 60 as well as ends 82 which bear downwardly against the second latching member 70.

Briefly stated, then, the two latching members are both mounted within the yoke 40 for scissoring movement about a common pivot bolt 63 so that the adjacent outwardly presented ends of the latching members move vertically in opposite directions into positions of engagement.

In accordance with the invention a manually operated releasing member is coupled to the latching members for overcoming the force of bias and temporarily disengaging latching members thereby providing adjustment of the handle in both directions. More specifically a releasing member is provided in the form of a Bowden-type cable which, in the preferred embodiment, is mounted freely with its control wire connected to one of the latching members, and the adjacent end of the sheath connected to the other, for movement in opposite directions and with stop surfaces on the yoke for limiting the degree of disengaging movement of the latch members to insure full release of both of them. Referring especially to FIG. 7, the Bowden cable generally indicated at 90 has a control wire 91 which is connected to the knob 28 (FIG. 2) and which reciprocates in a flexible sheath 92. The ends of the control wire and sheath, indicated at 93, 94, are connected to the outer ends of the latching members 70, 60, respectively.

Since the Bowden cable is "free," that is, unattached to the frame at its remote end, preferably being formed into a loop (see 95 in FIG. 1), the sheath is free to move so that relative movement of the control wire 91 has two effects: When the knob 28 is pulled out the latching member 70 is swung upwardly in a releasing direction and, at the same time, because of reaction force, the latching member 60 is swung downward, by the sheath 92, also in its releasing direction. Since the latching members during retraction of the knob act against one another, they will either move simultaneously, if the reaction forces are the same, or move in sequence, with the member having the smallest reaction force moving first. In any event for the purpose of insuring that both latching members release fully, stop surfaces are placed in the paths of scissoring movement. Preferably the stop surfaces are in the form of an interposed pin 95 transversely mounted in the yoke. In operation the most easily moved of the two latching members will be first to strike the pin and, with such latching member thereafter held stationary, the remaining latching member will be drawn toward it for full release of both of them.

In accordance with one of the aspects of the present invention, means are optionally provided for relatively inhibiting the releasing movement of one of the latching members so that release of the latching members occurs sequentially upon moving the releasing member in the releasing direction. By inhibiting release of one of the latching members the remaining member has priority of movement so that, by pulling the control knob 28 out only half way, release occurs for movement of the handle about one of the axes while the handle remains locked with respect to the other axis. Suppose, for example, that it should be decided that handle adjustment in the vertical direction is most often necessary while lateral adjustment is only occasionally required. Under such circumstances means are provided for inhibiting motion of the latch member 70 so that when the knob 28 is pulled out halfway it remains engaged while the latching member 60, controlling the vertically movement, is fully released, enabling the handle to be moved upwardly or downwardly to a new position without affecting its azimuthal position. Movement of the latching member 70 may be inhibited by frictional means as, for example, by interposing wavy spring washers between the front ends 71 of the latching member and the respective side walls of the yoke. However, I prefer to inhibit movement of the selected latching member by using an auxiliary spring faced to bias the latching member to its engaged position. Such spring indicated at 100 in FIG. 9, has a first end 101 which is anchored with respect to the yoke and a second end 102 which presses downwardly upon the latching member 70. Thus when the control knob 28 is pulled out halfway the first latching member 60 which controls vertical movement of the handle, and which is acted upon only by the spring 80, will be moved into engagement with the pin 95 thereby releasing the handle for vertical adjustment.

Where both types of adjustment are required the control button 28 is pulled out the rest of the way against the biasing force of both of the springs 80, 100 resulting in full and sequential retraction of the tooth 76 of lower latching member from the aperture 77 which it occupies in the base plate. This permits the handle to be swung to the right or left of center in the direction of the arrows in FIG. 8 until the handle and yoke are oriented with the lower latching member in a condition of register with one of the alternative recesses. At the same time the handle is raised or lowered to a more convenient elevation. Following this the button 28 is released permitting the biasing springs 80, 100 to become effective. It may be noted that while both positions of locking, vertical and lateral, are in graduated steps, it is not necessary to use care in registering the handle with the stepped positions. All that is required is to position the handle approximately in the desired new position followed by release of the control button. Finally the handle is manually oscillated through a short arc both vertically and laterally whereupon the latch members will automatically snap into the closest stepped position. While, for the sake of simplicity, only three recesses 77 have been provided in the base plate 30, it will be appreciated that the invention is not limited thereto and that additional recesses may be employed, for example five of them, where it is desired to provide two lateral positions for the handle on each side of the central position.

Figures 8, 9, 10:
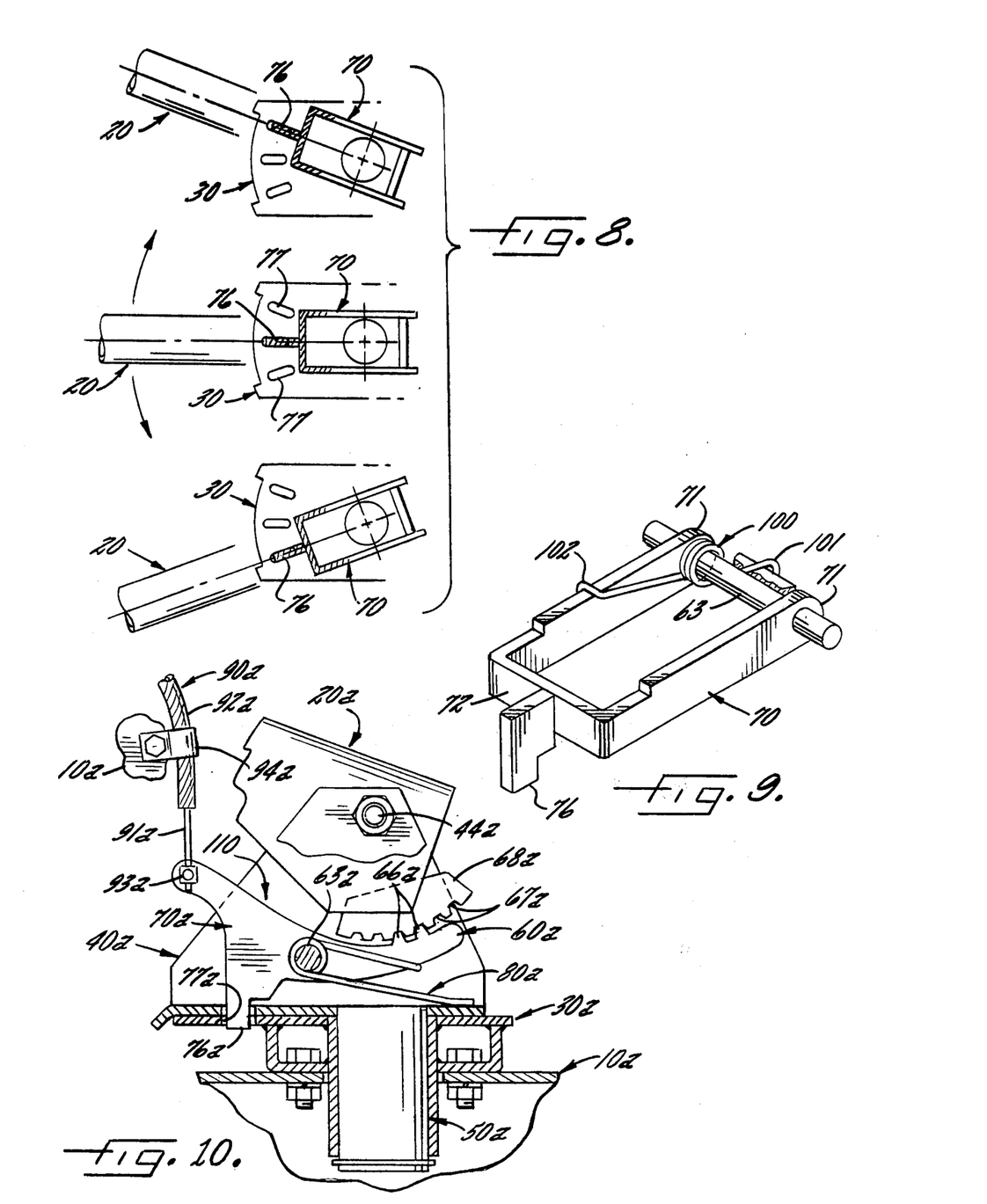
FIG. 8 is a diagrammatic top view showing the yoke in three positions of lateral adjustment with respect to the base member.
FIG. 9 is a fragmentary perspective showing the base latching member with an auxiliary spring which may be optionally employed to secure sequential release of the latch members.
FIG. 10 is a view similar to FIG. 4 but showing an alternative construction in which the latching members are embodied in a single, centrally pivoted lever rather than in a pair of levers arranged side by side.

While the invention has been described in connection with a preferred construction in which the latching members, indicated at 60, 70 are in the form of separate levers which are pivoted at one end for relative scissoring movement, the invention is not limited thereto and, if desired, the latching members controlling the vertical and horizontal swing of the handle may be integrated into a single centrally pivoted lever. Such structure is illustrated in FIG. 10 where corresponding reference numerals are used to indicate corresponding parts, with addition of subscript a. Thus a unitary handle 20a is superimposed above a base plate 30a with a yoke 40a interposed between them. The handle is received within the side walls of the yoke and pivoted to a transversely extending pivot bolt 44a. Lateral swing of the handle and the yoke with respect to the base plate 30a is accommodated by a vertical pivot 50a.

For locking the handle in a vertically adjusted position a latching member 60a is provided having at least one upwardly extending tooth 66a which engages one of the recesses 67a in circular rack 68a. To lock the handle, and the yoke which is connected to it, in a selected position of lateral swing, a latching member 70a is provided having a downwardly extending tooth 76a which engages a selected recess 77a in the base plate. The latching members 60a, 70a are in the form of separate arms extending on opposite sides of a central pivot 63a, the two arms, taken together, forming a lever 110.

The latching members are biased into their illustrated engaging positions by means of a biasing spring 80a, here shown as a torsion spring, which acts to bias the lever 110 in the counter clockwise direction.

For the purpose of overcoming the force of bias and for temporarily disengaging the latching members, a Bowden cable 90a is provided formed of a control wire 91a and a sheath 92a. The end 93a of the control wire is connected to the end of the lever 110 while the end 94a of the sheath is anchored to frame 10a of the implement.

In operation pulling upon the control knob 28 swings the lever 110 clockwise thereby disengaging both of the latching members 60a and 70a. After moving the handle to a new and more convenient position the control knob is released allowing the spring 80a to act, following which slight oscillation of the handle in both the vertical and horizontal directions permits the latching members to snap into position under the force of bias.

Where it is desired to have release at the two axes occur sequentially, to provide priority for one of the two functions when the knob 28 is pulled out halfway, the release of the remaining function may be inhibited by the simple expedient of effectively elongating the associated tooth. For example where it is desired that the handle be released for re-positioning in the vertical direction without affecting its lateral position, the tooth 76a of the latching member 70a may be elongated. In such event pulling the knob out halfway will free the handle for vertical movement while the tooth 76a is still engaged in the recess 77a; however, upon pulling the knob 28 out all of the way complete release of both functions will occur.

While it is one of the important features of the present invention that a single control button operating a single Bowden cable is employed to temporarily disengage the latching members, either simultaneously or sequentially, it is possible in the first embodiment of the invention to employ separate cables with separate control knobs for controlling the respective functions. Where separate cables are used the end of each control wire is connected to a latching member while the adjacent end of the sheath is connected to the frame, just as in the case of the second embodiment illustrated in FIG. 10. Such possibility is included within the scope of the term "means including a manually operated releasing member for temporarily disengaging the latching members" as used herein.

It is one of the features of the present construction that a unitary handle is used which is to be contrasted with the bifurcated handles having separate termination at the lower end as employed in the prior art mentioned above. By a "unitary" handle is meant that a lower end of the handle is in the form of a single longitudinal element which may be conveniently pivoted in nested position between the side walls of the yoke, even though the upper portion of the handle may be bifurcated.

In the illustrated embodiments of the invention the base pivot connection 50 is referred to as having a vertical axis. It is to be understood that the term "vertical" is to be interpreted as substantially vertical since the base plate may be canted forwardly or backwardly a slight amount without departing from the invention. The term "base plate" or "base member" as used herein will be understood to refer to any structure which supports the vertically oriented bearing 52 with respect to the frame of the implement.

In the disclosed constructions the frame is supported by powered ground-engaging wheels 11, 12. However, it is quite conceivable that the handle adjusting means of the present invention may be used without supporting wheels in which case the ground-engaging tines would perform the supporting function thereby responding to the term "wheels" as used herein.

It will be apparent that the construction has amply fulfilled the objects of the invention. The yoke, being box-like, has high inherent strength and resistance to deformation even though constructed of relatively light gauge metal. The recesses at the lower end of the handle and both of the latching members enclosed within the yoke not only form a compact and efficient package but are fully protected and substantially unaffected by dirt or the existence of rust or corrosion. Operation is positive, and light control forces suffice to produce temporary disengagement of the latching members to provide safe, positive and convenient operation without necessity for maintenance over the life of the implement.

What I claim is:

1. In a walk-behind garden implement, the combination comprising a horizontally extending frame including a base member, ground engaging wheels for supporting the frame, a unitary handle extending upwardly and rearwardly from said base member and having a lower end and an upper guiding end for manual guidance of the implement, a yoke of hollow construction interposed between the lower end of the handle and the base member and connected to them by respective handle and base pivot connections, the handle pivot connection having a horizontal axis for angular elevation of the handle with respect to the frame and said base pivot connection having a vertical axis for azimuthal swing of the handle with respect to the frame, a first latching means defining an arcuately arranged set of spaced recesses at the lower end of the handle for holding the handle rigidly at a selected elevation, a second latching means defining an arcuately arranged set of spaced recesses in the base member for holding the handle rigidly at a selected azimuth, the latching means including separate latching members arranged alongside one another within the yoke and movable into simultaneous register with respective sets of recesses, means interposed between the latching members for biasing the latching members in opposite directions into latching position, and means including a manually operated releasing member coupled to the said latch members for overcoming the force of bias and for temporarily disengaging the latching members thereby permitting the handle to be manually adjusted with respect to the frame to a more convenient elevation and azimuth.

2. In a walk-behind garden implement, the combination comprising a horizontally extending frame including a base member, ground engaging wheels for supporting the frame, a unitary handle extending upwardly and rearwardly from said base member and having a lower end and an upper guiding end for manual guidance of the implement, a yoke interposed between the lower end of the handle and the base member, the handle being pivoted to the yoke by a horizontally extending pivot connection for angular elevation of the handle with respect to the frame, the yoke being pivoted to the base member by a vertically extending pivot connection for azimuthal swing of the handle with respect to the frame, toothed latching means fixed to the lower end of the handle and a first latching member interposed between the handle and the yoke for cooperating with the toothed latching means for holding the handle rigidly at a selected elevation, second latching means including a second latching member interposed between the yoke and the base member to hold the handle rigidly at a selected azimuth, the latching members being individually mounted on the yoke for swinging movement about an axis parallel to the handle pivot connection and having means for biasing them to latching position, and a single manually operated releasing member coupled to both of said latching members for overcoming the force of bias and for temporarily disengaging the latching members thereby permitting the handle to be manually adjusted with respect to the frame to a more convenient elevation and azimuth.

3. In a walk-behind garden implement, the combination comprising a horizontally extending frame including a base member, ground engaging wheels for supporting the frame, a unitary handle extending upwardly and rearwardly from said base member and having a lower end and an upper guiding end for manual guidance of the implement, a yoke interposed between the lower end of the handle and the base member, and handle being pivoted to the yoke by a horizontally extending pivot connection for angular elevation of the handle with respect to the frame, the yoke being pivoted to the base member by a vertically extending pivot connection for azimuthal swing of the handle with respect to the frame, toothed latching means including a first latching member interposed between the handle and the yoke to hold the handle rigidly at a selected elevation, second toothed latching means including a second latching member interposed between the yoke and the base member to hold the handle rigidly at a selected azimuth, the latching members each being in the form of a lever and individually mounted on the yoke for pivotal movement about a common horizontally extending pivot axis and having means for biasing them to latching position, and a single manually operated releasing member coupled to said latch members for overcoming the force of bias and for temporarily disengaging the latching members thereby permitting the handle to be manually adjusted with respect to the frame to a more convenient elevation and azimuth.

4. In a walk-behind garden implement, the combination comprising a horizontally extending frame including a horizontal base member, ground-engaging wheels for supporting the frame, a unitary handle extending upwardly and rearwardly from said base member and having a lower end and an upper guiding end for manual guidance of the implement, a yoke of U-shaped cross section having a pair of spaced side walls and a bottom wall, the lower end of the handle being received between the side walls and having a horizontally extending pivot connection therewith for angular elevation of the handle with respect to the frame, the bottom wall of the yoke being seated with respect to the base member and having a vertically extending pivot connection therewith for azimuthal swing of the handle with respect to the frame, a first toothed latching means defining an arcuately arranged set of spaced recesses fixed at the lower end of the handle, a first latching member cooperating with said first toothed latching means and biased to latching position to hold the handle rigidly at a selected elevation, a second latching means defining an arcuately arranged set of spaced recesses on the base member, a second latching member cooperating with said second latching means and biased to latching position, the latching members both being pivoted between the walls of the yoke, and a single manually operated releasing member coupled to the latching members for overcoming the force of bias and for temporarily disengaging the latching members thereby permitting the handle to be manually adjusted with respect to the frame to a more convenient elevation and azimuth.

5. The combination as claimed in claim 2 or in claim 3 or in claim 4 in which the first and second latching members each have at one end a common horizontally extending pivot connection with the yoke and in which the biasing means consists of a single spring interposed between the latching members to urge the first one upwardly into latching position and the second one downwardly to latching position.

6. The combination as claimed in claim 2 or in claim 3 or in claim 4 in which the two latching members are mounted on the yoke for relative scissoring movement toward and away from one another and in which the releasing member is in the form of a free Bowden cable including a control wire telescoped in a flexible sheath, the end of the sheath being connected to the first latching member and the adjacent end of the control wire being connected to the second latching member.

7. The combination as claimed in claim 2 or in claim 3 or in claim 4 in which the two latching members are mounted on the yoke for relative scissoring movement toward and away from one another and in which the releasing member is in the form of a free Bowden cable including a control wire telescoped in a flexible sheath, the end of the sheath being connected to one of the latching members and the adjacent end of the control wire being connected to the other, and respective stop surfaces on the yoke arranged in the path of scissoring movement of the latching members to insure full release of both of them.

8. In a walk-behind garden implement, the combination comprising a horizontally extending frame including a horizontal base member, ground-engaging wheels for supporting the frame, a unitary handle extending upwardly and rearwardly from said base member and having a lower end and an upper guiding end for manual guidance of the implement, a yoke of U-shaped cross section having a pair of spaced side walls and a bottom wall, the lower end of the handle being received between the side walls and having a horizontally pivot connection therewith for angular elevation of the handle with respect to the frame, the bottom wall of the yoke being seated with respect to the base member and having a vertically extending pivot connection therewith for azimuthal swing of the handle with respect to the frame, a first toothed latching means defining an arcuately arranged set of spaced recesses at the lower end of the handle, a first latching member pivoted in the yoke and having an upwardly projecting tooth for engaging one of the recesses at the lower end of the handle for holding the handle rigidly at a selected elevation, a second toothed latching means defining an arcuately arranged set of spaced recesses in the base member, a second latching member pivoted in the yoke and having a downwardly projecting tooth for engaging one of the recesses in the base member for holding the handle rigidly at a selected azimuth, the latching members being pivoted for rocking movement about a common horizontally extending axis in scissoring relation so that the adjacent outwardly presented ends move vertically in opposite directions as the latch members are engaged and disengaged, stop surfaces on the yoke for limiting the degree of disengaging movement, and releasing means including a free Bowden cable having a control wire telescoped in a flexible sheath with the end of the wire and the adjacent end of the sheath being respectively connected to the presented ends of the latching members for temporarily moving the latter to their disengaging positions thereby permitting the handle to be manually adjustable with respect to the frame to a more convenient elevation and azimuth.

9. The combination as claimed in claim 1 or in claim 2 or in claim 3 or in claim 4 or in claim 8 in which means are provided for relatively inhibiting the releasing movement of one of the latching members so that release of the latching members occurs sequentially upon moving the releasing member in its releasing direction.

10. The combination as claimed in claim 1 or in claim 4 or in claim 8 in which the means defining a set of arcuately arranged recesses at the lower end of the handle is in the form of an arcuate rack located below and concentric with the handle pivot connection.

11. In a walk-behind garden implement, the combination comprising a horizontally extending frame including a horizontal base member, ground-engaging wheels for supporting the frame, a unitary handle extending upwardly and rearwardly from said base member and having a lower end and an upper guiding end for manual guidance of the implement, a yoke of U-shaped cross section having a pair of spaced side walls and a bottom wall, the lower end of the handle beging received between the side walls and having a horizontally extending pivot connection therewith for angular elevation of the handle with respect to the frame, the bottom wall of the yoke being seated with respect to the base member and having a vertically extending pivot connection therewith for azimuthal swing of the handle with respect to the frame, means including a first latching member in the yoke interposed between the handle and the yoke and means including a second latching member in the yoke interposed between the yoke and the base member for holding the handle rigidly at a selected elevation and azimuth, said first and second latching members each having at one end a common horizontally extending pivot connection with the yoke, said latching members having engageable teeth at the other end to provide stepped adjustment, biasing means including a single spring interposed between the latching members for urging the first one upwardly into latching position and the second one downwardly into latching position, and means including a manually operated releasing member coupled to said latching members for overcoming the force of bias and for temporarily disengaging the latching members thereby permitting the handle to be manually adjusted with respect to the frame to a more convenient elevation and azimuth.

12. In a walk-behind garden implement, the combination comprising a horizontally extending frame including a horizontal base member, ground-engaging wheels for supporting the frame, a unitary handle extending upwardly and rearwardly from said base member and having a lower end and an upper guiding end for manual guidance of the implement, a yoke of U-shaped cross section having a pair of spaced side walls and a bottom wall, the lower end of the handle being received between the side walls and having a horizontally extending pivot connection therewith for angular elevation of the handle with respect to the frame, the bottom wall of the yoke being seated with respect to the base member and having a vertically extending pivot connection therewith for azimuthal swing of the handle with respect to the frame, means including a first latching member in the yoke interposed between the handle and the yoke and means including a second latching member in the yoke and the base member for holding the handle rigidly at a selected elevation and azimuth, said latching members being mounted on the yoke for relative scissoring movement toward and away from one another and having engageable teeth to provide stepped adjustment, means for biasing the latching members into latching position, means including a manually operated releasing member coupled to said latching members for overcoming the force of bias and for temporarily disengaging the latching members thereby permitting the handle to be manually adjusted with respect to the frame to a more convenient elevation and azimuth, and said releasing member being in the form of a free Bowden cable including a control wire telescoped in a flexible sheath, the end of the sheath being connected to the first latching member and the adjacent end of the control wire being connected to the second latching member.

* * * * *